United States Patent [19]

Wlos

[11] 3,836,747
[45] Sept. 17, 1974

[54] GAS WELDING CABLE AND GUN THEREFOR

[75] Inventor: Paul M. Wlos, Crete, Ill.

[73] Assignee: Welding Specialties, Inc., Thornton, Ill.

[22] Filed: Feb. 26, 1973

[21] Appl. No.: 335,955

[52] U.S. Cl.................... 219/130, 174/46, 219/74, 219/131 F
[51] Int. Cl............................................. B23k 9/12
[58] Field of Search............... 219/74, 75, 130, 136, 219/138–144, 131 F; 174/13 C, 46

[56] References Cited
UNITED STATES PATENTS

| | | | |
|---|---|---|---|
| 2,666,832 | 1/1954 | Landis et al. | 219/130 |
| 2,721,249 | 10/1955 | Landis et al. | 214/130 |
| 2,817,749 | 12/1957 | Flood et al. | 219/130 |
| 2,881,305 | 4/1959 | Wojciak et al. | 219/74 |
| 2,943,183 | 6/1960 | Simms et al. | 219/75 |
| 3,433,882 | 3/1969 | Henriksen et al. | 214/136 |
| 3,469,070 | 9/1969 | Bernard et al. | 219/130 |
| 3,590,212 | 6/1971 | Corrigall et al. | 219/136 |
| 3,610,875 | 10/1971 | Dacmolin | 209/130 |

Primary Examiner—Bruce A. Reynolds

[57] ABSTRACT

An arc welding gun, particularly for the use of the so-called MIG and TIG welding processes, in which the gun is constructed from an integral end portion of a welding cable, which is preferably of hollow construction, having a bore therethrough for the passage therethrough of a wire welding electrode or a shielding gas. Where wire electrode is supplied to the cable, a shielding gas may be supplied through an additional conduit external to the electrical conductor or the cable. The gun may be provided with control means, for example a manually actuatable switch, and as the terminal fitting of the welding head assembly is connected directly to the metallic conductor of the cable, all electrical joints are eliminated between the terminal fitting of the gun and the opposite end of the cable, preferably the connector terminal to the welding proper. As the gun utilizes the welding cable as an integral part, thereof, the terminal end portion, if desired, may be flexible permitting various gun configurations.

9 Claims, 3 Drawing Figures

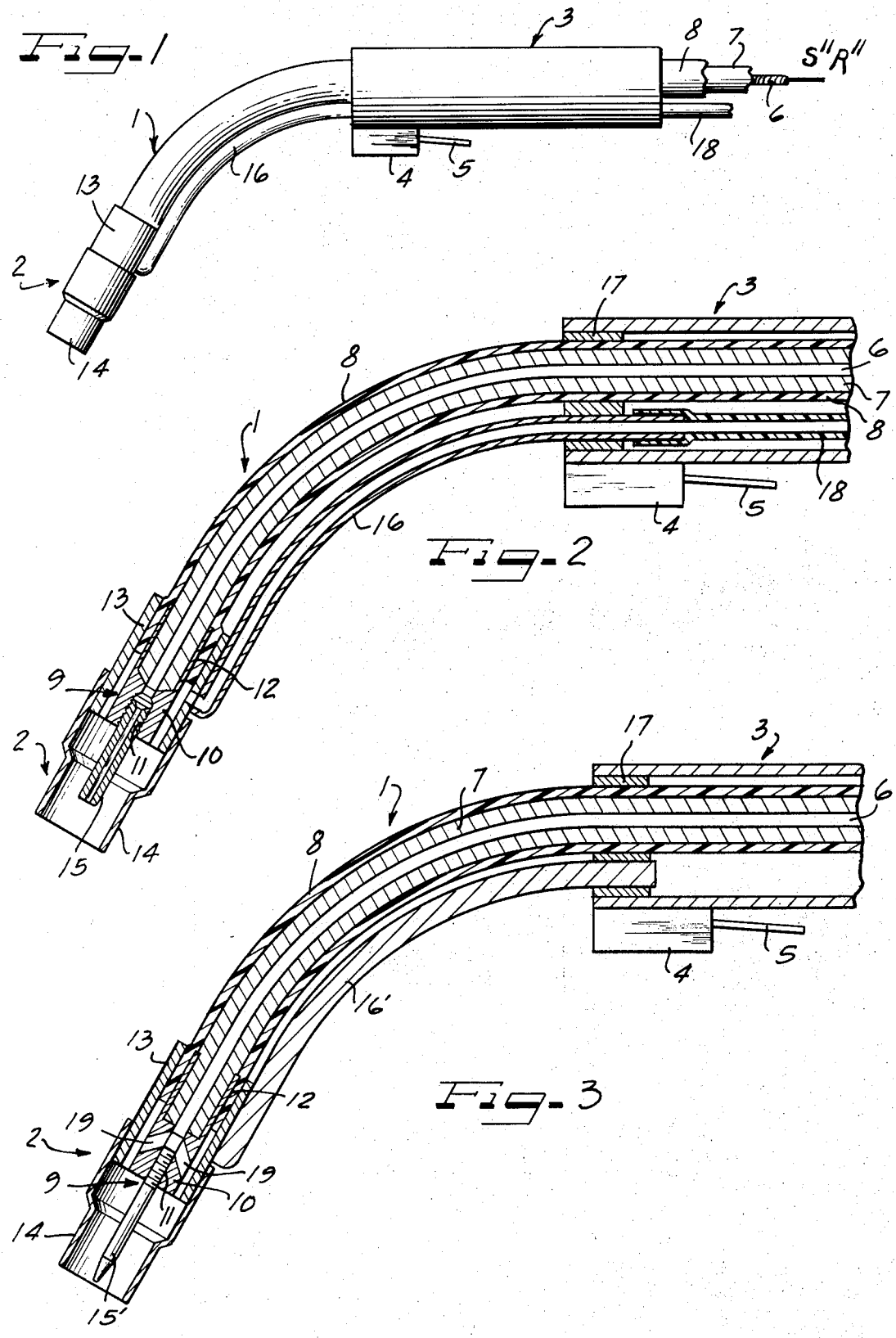

GAS WELDING CABLE AND GUN THEREFOR

BACKGROUND OF THE INVENTION

In arc welding most metals, shielding of the molten metal is necessary to protect the same from contamination by oxygen and nitrogen in the air and to help prevent loss of vital alloying elements during transfer through the arc. Failure to properly protect the molten metal may result in a weld which is of low strength, porous and which may break down. For many years fluxes and electrode coatings have been provided which decompose at the arc and thus provide a gas shield surrounding the same. This is particularly true with respect to stainless steel, which necessitates the use of some form of shielding if high quality welds are to be produced.

In recent years the use of a separate or independent inert gas source has been found advantageous in the welding of stainless steel and other metals by the so-called MIG and TIG processes, both of which employ an independent source of shielding gas. In the MIG (metallic inert gas) process, a filler metal in the form of a continuously fed wire is utilized with the welding site being shielded by a supply of inert gas, supplied, for example, from a suitable tank thereof and conducted by a conduit to the welding site.

In this form of welding, the wire filler metal functions as an electrode wire with the arc being formed between the free end of such wire and the work, the wire being continuously fed as it is melted into the joint, and the melted metal transferred across the arc to the work in the form of fine droplets or the like. In this arrangement the terminal fitting or nozzle of the welding gun is hollow with the electrode wire being passed axially through the nozzle, the latter being constructed to receive and discharge inert gas at the welding site and thereby form the desired protective shield.

In the TIG (tungsten inert gas) welding process the gun nozzle is provided with a non-consumable tungsten electrode which is operatively connected to the metallic conductor of the welding cable for conduction of the welding current thereto with the arc being produced between the end of the tungsten electrode and the work. Any filler metal required is supplied separately in the form of a rod or continuous wire.

More recently there have been developed so-called flux filled wires, in which the filler metal wire is of hollow construction and filled with fluxing agents which, when introduced into the arc, will provide a degree of gas shielding, or which are designed to produce a combination of gas and molten flux which are cooperable to provide a desired degree of shielding and thus possibly eliminate the need for a separate source of inert gas.

In the past many types of welding apparatus, i.e., cable and gun structures, have been developed for transferring the consumable welding electrode and welding current from relatively remote supplies to the welding arc. All of such types of apparatus have employed some form of a transfer structure, such as a flexible tube or conduit, in conjunction with a flexible current carrying conductor or cable, to convey consumable welding electrode and welding current to the welding gun and thus to the welding site. Such transfer structure herein termed "cable assembly" is adapted to be connected at its free end to a welding gun by means of a suitable mechanical joint between the various elements of the cable assembly, and in particular to transfer the consumable welding electrode and welding current to the welding gun. In other words, the cable, per se, forms one transfer medium and the gun a second transfer medium which is mechanically coupled thereto.

In the event the TIG process is involved, the cable assembly may be so constructed that it includes the supply conduit for the shielding gas and in some cases may also include means for supplying a continuous filler metal wire.

The welding gun itself is invariably made up of a plurality of distinct individual elements which are so constructed to form means of transferring consumable electrode and welding current to the welding arc, and possibly a supply of shielding gas. Depending on the type of welding done, as many as eight and as few as four distinct transfer members normally are utilized to convey the consumable electrode and welding current to the welding arc, which distinct members are assembled with various types of mechanical joints, for example swage joints, threaded joints, and suitably brazed or sodered joints, etc. The purpose of the respective individual elements and associated joints is to provide adequate means for effecting suitable conveyance of the consumable welding electrode and conduction of the necessary electric welding current to the welding arc.

At present, all electrical welding gun and associated cable assemblies leave much to be desired with respect to performance and ability to effectively transmit electric welding current and continuous lengths of consumable electrode to the welding arc, which conditions have resulted from the inherent gun designs employed.

These conditions may be considered with respect to the two major functions of the welding gun and associated cable assembly, i.e., the conduction of electric welding current from a remote source to the welding arc, and the feeding of the consumable electrode from a remote source to the welding arc.

With respect to the first major function under consideration, i.e., the transfer of electric welding current, it will be appreciated that, in order to maximize the efficient transfer of the relatively high welding current, it is necessary to minimize the resistance of the transfer medium involved. Preferably, high conductivity metals such as copper, brass, aluminum, etc. are normally employed as the current conducting material. However, while these metals are widely used in welding guns and welding current conductors, their ability to transfer or conduct welding current from a remote source to the welding arc may be severely limited by the existence of electrical interfaces or mechanical connections in the current path, which present points of relatively high electrical resistance in the flow of welding current.

The presence of such resistance points creates an electrical energy loss thereat which will be directly proportional to the mathematical product of the interface resistance and the square of the welding current being transferred through or conducted by the electrical interface. The energy losses involved will be dissipated in the form of heat in the region of the electrical connection involved, with any generated heat tending to raise the temperature of the electrical interface, thereby causing an increase in the electrical resistance thereat, which in turn will produce an increase in the amount of electrical energy lost or heat dissipated at the interface or connection. This action will normally continue until a stabilization or equilibrium temperature is reached, the stabilization or equilibrium temperature for a given current level being dependent upon the ability of the current carrying members, forming the interface and the surrounding media, to conduct the dissipated heat away from the interface or electrical connection. It will be apparent that as the number of joints or interfaces in the current path is increased, the current carrying capacity of the members forming the current path becomes more and more limited.

In addition to a possible severe limiting of the current carrying capacity, the heat generated at the mechanical connections in a welding gun results in the temperature of the gun assembly rising considerably above ambient temperature; and where the welding gun is manually operated, the heat generated within the gun assembly may, unless relatively low welding currents are involved, cause severe discomfort as well as a potential hazard to the operator. Further, the cyclic heating and cooling of such electrical joints may produce a loosening thereof and thereby further increase the electrical resistance and operating temperature of the gun assembly.

In addition, the heat generated within the current carrying members of the welding gun will tend to produce undesirable arc characteristics. It will be appreciated that as the temperature of the current carrying members of the welding gun increases, a voltage drop across such members will likewise increase, decreasing the voltage impressed across the arc and thereby creating a change in the welding arc characteristics. This condition may lead to low quality or even totally unsatisfactory welds as a result of improper weld penetration, excessive spatter, erratic arc action and inconsistent transfer of the weld metal across the arc.

The second major function of a welding gun and associated cable assembly in connection with the MIG process, is the transfer of continuous lengths of consumable electrode from a remote source to the welding arc. Again, in order to maximize the efficient transfer of consumable electrode it is necessary to minimize the resistance of the transfer medium to the feed movement thereof.

As the consumable electrode is, in most cases, in the form of a wire of circular cross section it is usually transferred from a remote supply to the welding arc through a series of tubular members having an internal diameter greater than the diameter of the electrode being transferred in order to provide an unobstructed path to the welding arc. All welding guns utilize some sort of flexible tube or conduit which is mechanically connected to the gun in such a manner that the inner circular section of the flexible tube will be aligned with the inner circular section of a tubular member within the gun, the latter in many instances being constructed with two or more tubular members mechanically joined to provide a continuous path or tube to the welding arc. Such mechanically joined tubular members within the welding gun assembly have presented a constant source of problems. It will be appreciated that any slight misalignment of the tubular members forming the electrode path from the flexible conduit to the welding arc will create points of high resistance to the flow of the continuous wire electrode, thereby causing erratic wire flow and resulting in poor welding arc characteristics.

Further, misaligned or loosened joints often effect a shaving of the wire electrode or flaking off of coating found on many wire electrodes. The particles thus removed from the wire electrode may build or cake up within the tubular wire path and rapidly increase the resistance to wire flow, and may eventually result in a totally obstructed path.

In many instances the coating on welding wire electrode is metallic in composition, as for example with respect to copper flashed or coated welding wire. Such electrically conductive coating is separated therefrom in the form of fine flakes or particles which tend to migrate through any mechanical joint within the gun assembly. Such fine conductive particles may eventually form a conductive layer over the insulating materials used in the welding gun assembly to insulate the handle and other exposed parts from the welding voltage present on the welding current conductors within the welding gun. Any conductive path thus established presents a potential electrical hazard to the operator of the welding gun, either exposing him to arc welding voltage or control voltage at the remote electrical switch found on most welding guns. Remote control gun switches likewise may become contaminated with the fine conductive particles, thereby causing erratic switch action and eventual failure of the switch.

As the TIG process may utilize a wire type filler metal, likewise fed from a suitable supply source, related problems may arise in the operation of welding cables and guns therefor.

The present invention therefore has as a primary object, the production of a very simple gun and cable construction which eliminates the previously discussed disadvantages of prior arrangements.

BRIEF SUMMARY OF THE INVENTION

The desired objectives of the present invention are achieved by the utilization of a continuous cable assembly, preferably extending continuously from the welding current supply source to the welding head assembly disposed at the welding site, which may involve merely a single junction or connection of the current carrying conductor of the cable assembly at its connection at one of its ends to the welding current supply source, and at the other of its ends to the terminal fitting associated with the electrode wire in the case of the MIG process, or associated with the tungsten electrode in the case of the TIG process. The operator's manually engageable handle is, in this case, mounted on the cable assembly at a point spaced from the nozzle end thereof and, if present, may carry the operator's control switch.

The extreme free end of the welding cable is provided with a terminal or end fitting which is suitably rigidly connected with the adjacent free end of the metallic conductor carrying the welding current.

Where the gun is designed for MIG welding, preferably the electrical conductor is provided with an axially extending passageway therein, for example, as defined by a suitable flexible tubular member, through which the wire electrode may be conducted. In this construction, if the arc shielding is to be provided by an independent separate inert gas, the cable assembly may be provided with a suitable additional gas-carrying tube whereby the gas may be conducted to the welding head assembly, at the free end of the cable, and supplied to the interior of a hollow nozzle forming the free end of the assembly, with the gas thus being discharged directly on and enclosing the arc produced. Such gas tube may, for example, extend along and parallel the current conduction externally thereof. The portion of the cable assembly extending between the manually grippable handle structure and the head assembly at the free end of the cable assembly, thus forming a portion of the gun structure, may be rigidly maintained in a predetermined configuration by employing a gas-carrying tube of rigid construction between the handle structure and the head assembly. Alternatively, if desired, the gun assembly may be relatively flexible by utilizing a gas tube of flexible construction between the handle and head assembly, for example, of flexibility comparable to that of the associated section of the cable assembly.

Where the TIG welding operations are involved, with a tungsten electrode forming the extreme end of the current conducting structure, the head may be provided with passages which communicate with the hollow flexible tube of the cable which, in such case, may be utilized as the supply conduit for the inert shielding gas. In such case, the filler metal may be provided, for example, in the form of a rod or wire which is supplied exteriorly of the gun nozzle.

BRIEF DESCRIPTION OF THE DRAWINGS

In the drawings wherein the like reference characters indicate like or corresponding parts:

FIG. 1 is a side elevational view of a welding gun, illustrated as being of the MIG type, constructed in accordance with the present invention;

FIG. 2 is a longitudinal sectional view through the gun structure illustrated in FIG. 1; and FIG. 3 is a sectional view similar to FIG. 2, illustrating the construction of a gun in accordance with the present invention for use in TIG welding processes.

DETAILED DESCRIPTION OF THE INVENTION

Referring to the drawings and more particularly to FIGS. 1 and 2, the reference numeral 1 indicates a cable assembly having a welding head assembly, indicated generally by the numeral 2, secured to the free end of the cable assembly 1. Spaced from the welding head assembly 2 and encircling the cable assembly 1 is a handle structure, indicated generally by the numeral 3, illustrated as also carrying a control switch 4 having an actuating lever 5 adapted to be manipulated by the operator while grasping the handle 3, for controlling the welding current. The cable assembly 1, in the construction illustrated in FIGS. 1 and 2, is of concentric construction having an inner tubular member 6, illustrated in the example as being a monocoil, over which is laid in concentric relation a plurality of current conducting strands of copper or other suitable metal, preferably laid in a plurality of layers, for example two, which are illustrated as wound in opposite pitch directions to form a hollow current carrying conductor 7 with the latter being enclosed in an insulating jacket or sheath 8 of a suitable relatively flexible plastic of a type such as commonly employed with the present welding cable, for example a neoprene or silicon rubber.

As illustrated in FIG. 2, secured to the free end of the conductor 7 is a cable terminal or end fitting 9, which likewise may be constructed of copper or other suitable metal having secured thereto, for example by cooperable threads, a hollow contact tip 10, the interior of which is axially aligned with the interior of the tubular member 6, whereby the filler metal of wirelike configuration (wire R in FIG. 1) may be fed through the tube 6 and discharged from the tip 10.

As illustrated, the terminal fitting 9 is provided with an end portion 10, having a threaded bore 11 therein aligned with the interior of the tubular member 6, and a tubular sleeve portion 12 which encircles the circumferential portion of the conductor 7 at the free end thereof, the fitting being suitably secured thereto for example by swaging, brazing or other suitable means, to form an integral end structure, with the adjacent end portion of the sheath 8 extending over the periphery of the sleeve portion 12. A nozzle support sleeve or fitting 13, of suitable material, encircles the adjacent portion of the sheath 8 and is rigidly clamped to otherwise secured thereto. Extending axially outward from the free end of the support sleeve 13, in substantially concentric relation with respect to the conductor 7 and tube 6, is a nozzle 14 which is illustrated as being concentric with a contact tip 15, the inner end of which is threaded into the bore 11 of the terminal or end fitting 9 with the free outer end of the tip 13 terminating adjacent the end of the nozzle 14. Extending exteriorly along the end portion of the cable 1 is a gas supply tube 16 having its free end secured to the support sleeve 13 with the interior of the tube 16 communicating with the annular space between the support sleeve and the end fitting 9 of the cable assembly, thus completing a gas passageway to the open end of the nozzle 14.

In the embodiment of the invention illustrated, the opposite end of the tube 16 is mounted in a handle header block 17 having a bore therein through which the cable assembly (including the jacket or sheath) 8 extends, the tube 16 likewise extending through the block 17 and adapted to receive the adjacent end of a flexible gas supply hose 18, adapted to extend parallel to and preferably suitably secured to the cable.

The handle member 3, which is illustrated as being of tubular construction, with a cross section of cylindrical, oval or other suitable configuration, encircles the adjacent portions of both the cable 8 and the gas supply base 18, with the forward end of the handle 3 being rigidly supported by the header block 17. The handle member 3 may carry suitable control means, as for example the control switch 4 having actuating lever 5. The switch 4 is adapted to be operatively connected to the supply or source of welding current by suitable wiring (not illustrated) which however may run coextensively with the cable 8 and hose 18 by means of which the welding equipment may be suitably controlled.

It will be appreciated that the only joints in the construction described are those located at the terminal or end fitting 9 and the tip 15. As the terminal or end fitting may be secured to the conductor 7 to provide very efficient current carrying characteristics, substantially the only juncture of any consequence is that between the contact tip 15 and the end fitting 9. The threaded connection between these parts provides a relatively large surface area and at the same time may be further operatively improved by the use of a suitable conductive gel or similar material of the type commonly employed to improve conductive connections between heated parts. Assuming that the opposite end of the cable is connected without intermediate joints to the current supply source, the conductor 7 may run continuously from such supply source to the end fitting 9, providing exceptionally efficient current carrying characteristics.

As the contact tip 15 is detachable, replacement thereof, may be readily accomplished, the tip being suitably provided if desired, with a wrench-engageable configuration by means of which removal of the tip may be facilitated.

It will be appreciated that the gas tube 16 may be of either flexible or rigid construction. If the tube is flexible, the section of the cable assembly extending between the welding head assembly 2 and the handle 3, i.e., the "gooseneck" portion, will be flexible to permit adjustment of the configuration thereof. If the tube is of rigid construction, it will be operative to maintain the adjacent portion of the cable assembly in a configuration corresponding to that of the tube, as for example an arcuate configuration such as illustrated in the drawings.

The adjustment of the configuration of the end portion of the cable is further facilitated by the cable construction, in which the insulating jacket 8 is applied with an interference fit between it and the conductor 7, whereby the insulating jacket is under tension and the conductor 7 under compression. Such interference fit normally may cover a range of 0.005 inch to 0.200 inch, providing a cable construction which may be flexed or bent into various configurations by the application of suitable force, but upon the release of such force will take a sufficient set to maintain a desired configuration under normal operating conditions.

The construction illustrated in FIG. 3 is generally quite similar to that of FIG. 2 with the exception that the gas tube 16 is omitted and the hollow contact tip 15 is replaced by solid tungsten electrode 15'. In this construction the tubular member 6 is employed to conduct the shielding gas to the nozzle 14 and thus to the welding site. To accomplish these results, in view of the solid construction of the tungsten electrode 15', the terminal or end fitting 9 is provided with one or more ports 19 which operatively connect the interior of the tubular member 6 with the annular space disposed between the end fitting 9 and the sleeve 13, thus operatively connecting the tubular member 6 with the nozzle 14.

In the event the section of the cable assembly 8, extending between the welding head assembly 2 and the handle 3, is to be of a fixed configuration, the welding head assembly 2 may be operatively connected to the header block 17 by a rod like member 16' illustrated in the construction of FIG. 3 as having the same configuration as the gas tube 16 but in this case functioning merely to maintain the portion of the cable forming the gun structure in fixed configuration.

As in the construction illustrated in FIG. 2, the tubular member 6 may be either a flexible tube of suitable material or a suitable mono-coil liner.

It will be appreciated from the above disclosure, that I have provided a combination gun and cable assembly employing a continuous cable which may extend the current input fitting to the contact or electrode tip, eliminating a multi-jointed construction, providing a lower voltage drop and reduced heating in the handle and gooseneck portion of the gun structure. Thus, for a given conductor cross section the welding current capacity rating can be increased, or the cross section can be reduced for the given current rating, to achieve both a cost and weight reduction. At the same time, the invention may eliminate as much as ten individual parts in the gun structure with a proportionate reduction in manufacturing costs. Further, the one piece flexible tubing extending the full cable length improves the wire feeding characteristics and over all efficiency of the system as the only component aligned with the tubular member is the replaceable contact tip, which may be aligned with the end fitting and thus with the tubular member. All other components that would be subject to misalignment or would present sharp edges are eliminated.

The invention further enables the gooseneck portion of the assembly to be either adjustable or fixed with respect to the handle of the of the gun, and if desired, may be readily provided with interchangeable gas tubes or detachable retaining members to provide a convertible gooseneck arrangement which may be selectively maintained in a fixed position or may be flexed as desired. It will be appreciated that the flexible arrangement permits the gun to be employed in confined areas as well as to enable fabrication of a wide variety of joints heretofore inaccessible with a rigid type of gun structure. In this connection, the length of the gooseneck portion may be selected for specific application.

It will also be appreciated from the above disclosure that as the insulating jacket of the cable is continuous, the tendency of loose copper flash, or the like, to migrate through the feeding system, with attendant possible malfunction and failure of the gun switch etc., is materially reduced.

Likewise any residue collecting in the cable can be more readily removed because of the continuous construction of the structure. For example, foreign material may be purged from the tubular member by the introduction of compressed air at either end of the gun and cable assembly, and with the absence of joints in the assembly, the full force of the air stream will extend completely through the cable rather than being diminished at various joints, and with the elimination of the possibility of such cleaning process forcing copper flash out through the various joints, etc.

As mentioned, where the gooseneck of the gun is to be flexible, the handle header block 17 may be longitudinally disposed within a desired range with respect to the nozzle, the distance being dependent on the nature or the weld, and where extremely accurate control as to size, location and appearance of the weld is required, the stand off distance between the nozzle and the handle may be suitably reduced, minimizing the effect of undesired hand movement on the part of the operator. Where the welding operations do not have such accuracy requirements the stand off distance could be increased, resulting in increased operator comfort with respect to the heat of the arc, and with reduced exposure to ultraviolet radiation. At the same time the use of a long stand off arrangement would provide better balance in the welding gun, as the cable weight at the opposite ends of the handle would be more comparable.

Having thus described my invention, it will be obvious that although minor modifications might be suggested by those versed in the art, it should be understood that we wish to embody within the scope of the patent warranted hereon all such modifications as rea- sonably and properly come within the scope of my contribution to the art.

I claim as my invention:

1. In an inert gas arc welding device, an integrated current-conducting cable and welding gun assembly comprising, in combination:
   a hollow, flexible, current-conducting tubular cable of uniform cross section comprising a plurality of conductive metal strands and having a welding-current supply end and a welding-head assembly end,
   a flexible inner tubular member within said hollow cable and extending continuously from said welding-current-supply end to said welding-head-assembly end,
   an electrically insulating sheath surrounding said current-conducting tubular cable,
   a conductive contact tip at the welding-head-assembly end integrally secured to said current-conducting tubular cable, and having a threaded aperture axially aligned with said flexible inner tubular member for threadably receiving one of, (a) an elongated solid tungusten electrode, and, (b) an elongated hollow contact tip having an axially extending passageway forming a feed channel for a consumable wire-like electrode, and
   an insulated fitting surrounding said contact tip and at least partly spaced therefrom, with means for supplying an inert gas to the resulting space to provide a flow of inert gas around said contact tip and said electrode.

2. The inert gas arc welding device of claim 1 wherein said current-conducting tubular cable comprises at least two layers of strands laid in opposite pitch directions.

3. The inert gas arc welding device of claim 1 wherein said flexible inner tubular member comprises relatively flexible smooth-walled tubing.

4. The inert gas arc welding device of claim 1 wherein said flexible inner tubular member comprises a wire wound monocoil.

5. The inert gas arc welding device of claim 1 including a replaceable, generally cylindrical, open tubular nozzle extending from said insulated fitting and beyond said electrode.

6. The inert gas arc welding device of claim 1 wherein said inert gas supplying means comprises a tube exterior of said sheath.

7. The inert gas arc welding device of claim 6 wherein said tube is relatively rigid near the welding-head-assembly end thereof.

8. The inert gas arc welding device of claim 1 including a handle member mounted on an intermediate portion of said sheath in spaced relation from said welding-head-assembly end to provide a length of cable extending from said handle to said end.

9. The inert gas arc welding device of claim 8, including a manually activated switch means associated with said handle member for controlling welding current to said current-conducting tubular cable.

* * * * *